US010588306B2

(12) United States Patent
Hur et al.

(10) Patent No.: US 10,588,306 B2
(45) Date of Patent: Mar. 17, 2020

(54) WIRELESS SMART MOSQUITO AND INSECT TRAP DEVICE, NETWORK AND METHOD OF COUNTING A POPULATION OF THE MOSQUITOES OR INSECTS (71) Applicant: UNIVERSITY OF FLORIDA RESEARCH FOUNDATION, INCORPORATED, Gainesville, FL (US)

(72) Inventors: Byul Hur, Gainesville, FL (US); William R. Eisenstadt, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 178 days.

(21) Appl. No.: 15/566,930

(22) PCT Filed: Apr. 13, 2016

(86) PCT No.: PCT/US2016/027352
§ 371 (c)(1),
(2) Date: Oct. 16, 2017

(87) PCT Pub. No.: WO2016/168347
PCT Pub. Date: Oct. 20, 2016

(65) Prior Publication Data
US 2018/0279598 A1    Oct. 4, 2018

Related U.S. Application Data
(60) Provisional application No. 62/146,904, filed on Apr. 13, 2015.

(51) Int. Cl.
*A01M 1/06* (2006.01)
*A01M 1/02* (2006.01)
(Continued)

(52) U.S. Cl.
CPC .............. *A01M 1/026* (2013.01); *A01M 1/02* (2013.01); *A01M 1/023* (2013.01); *A01M 1/06* (2013.01);
(Continued)

(58) Field of Classification Search
CPC .......... A01M 1/026; A01M 1/06; A01M 1/10; A01M 1/106
(Continued)

(56) References Cited

U.S. PATENT DOCUMENTS

| 4,858,376 | A | * | 8/1989 | Reed ....................... A01M 1/06 43/139 |
| 5,052,147 | A | * | 10/1991 | Broomfield ............. A01M 1/06 43/139 |

(Continued)

FOREIGN PATENT DOCUMENTS

| CN | 202773846 | 3/2013 |
| CN | 203243847 | 10/2013 |

(Continued)

OTHER PUBLICATIONS

PCT/US2016/027352; International Search Report and Written Opinion; dated Aug. 8, 2016; 16 pages.

*Primary Examiner* — Darren W Ark
*Assistant Examiner* — Danielle A Clerkley
(74) *Attorney, Agent, or Firm* — Timothy H. Van Dyke; Beusse, Wolter, Sanks & Maire PLLC (57) ABSTRACT

Embodiments relate to smart mosquito and insect trap devices, networks and method for detecting, counting, trapping and discarding a population of mosquitoes and/or insects. The mosquito species include the ones such as *Aedes* mosquito species that can cause Zika virus diseases. The device comprising a housing (201) having a directional force through a narrow path (240) to move an insect or mosquito
(Continued)

in a predetermined direction. The device comprises one or more detectors (255) to detect a presence of an insect or mosquito along the path (240). An isolated basket (260) or trap is included to trap the insect or mosquito at a location below or at an end of the path. A processor (352) tracks a count of a population in the basket based on detection of the presence of the insect or mosquito.

18 Claims, 8 Drawing Sheets

(51) Int. Cl.
    *A01M 1/08*     (2006.01)
    *A01M 1/10*     (2006.01)
    *A01M 1/12*     (2006.01)
    *G05B 15/02*     (2006.01)

(52) U.S. Cl.
    CPC .............. *A01M 1/08* (2013.01); *A01M 1/106* (2013.01); *A01M 1/12* (2013.01); *G05B 15/02* (2013.01); *Y02A 50/371* (2018.01)

(58) Field of Classification Search
    USPC .............................................. 43/58, 107, 111
    See application file for complete search history.

(56) References Cited

U.S. PATENT DOCUMENTS

| | | | |
|---|---|---|---|
| 6,640,489 B1 * | 11/2003 | Boulton | A01M 1/06 |
| | | | 43/139 |
| 6,653,971 B1 | 11/2003 | Guice et al. | |
| 6,708,443 B2 | 3/2004 | Hall | |
| 8,705,017 B2 | 4/2014 | Hyde et al. | |
| 9,335,413 B2 † | 5/2016 | Weber-Grabau | |
| 2007/0169401 A1 * | 7/2007 | Chyun | A01M 1/145 |
| | | | 43/113 |
| 2010/0037512 A1 * | 2/2010 | Durand | A01M 1/023 |
| | | | 43/139 |
| 2013/0204581 A1 * | 8/2013 | Park | A01M 1/026 |
| | | | 702/188 |
| 2014/0075824 A1 * | 3/2014 | Roulston | A01M 1/023 |
| | | | 43/107 |

FOREIGN PATENT DOCUMENTS

| | | | | |
|---|---|---|---|---|
| EP | 1477061 A1 | 11/2004 | | |
| JP | 2005021074 A | 1/2005 | | |
| JP | 2009195190 A * | 9/2009 | | A01M 1/08 |

\* cited by examiner
† cited by third party

WIRELESS SMART MOSQUITO AND INSECT TRAP DEVICE, NETWORK AND METHOD OF COUNTING A POPULATION OF THE MOSQUITOES OR INSECTS

CROSS-REFERENCE TO RELATED APPLICATIONS

This application claims benefit of U.S. Provisional Application No. 62/146,904 filed Apr. 13, 2015, titled "WIRELESS SMART MOSQUITO AND INSECT TRAP DEVICE, NETWORK AND METHOD OF COUNTING A POPULATION OF THE MOSQUITOES OR INSECTS," incorporated herein by reference as if set forth in full below.

BACKGROUND

Embodiments relate to mosquito traps and, more importantly, to a smart mosquito and insect trap device, network and methods of detecting, counting, trapping and discarding a population of the mosquitoes or insects. The mosquito species include the ones such as *Aedes* mosquito species that can cause Zika virus diseases.

Mosquito and flying insect traps have been used for various purposes. Flying insect traps are traditionally checked by technicians on a frequent (daily) basis which is necessary for experiments, logistics and safety. The technician may count the insects by hand which can be hazardous.

SUMMARY

Embodiments relate to smart mosquito and insect trap devices, networks and method of detecting, counting, trapping and discarding a population of mosquitoes and/or insects. The mosquito species include the ones such as *Aedes* mosquito species that can cause Zika virus diseases. The device comprises a housing having a directional force through a path to move an insect or mosquito in a predetermined direction. The device comprises one or more detectors to detect a presence of an insect or mosquito along the path. An isolated basket or trap is to trap the insect or mosquito at a location below or at an end of the path. A processor tracks a count of a population in the basket based on detection of the presence of the insect or mosquito.

An aspect of the embodiments include a network comprising a plurality of insect or mosquito trapping devices in communication with each other. Each device comprising a housing having a directional force through a narrow path to move an insect or mosquito in a predetermined direction. One or more detectors detect a presence of an insect or mosquito along the narrow path. An isolated basket traps the insect or mosquito at a location below or at an end of the narrow path. A processor to track a count of a population in the basket based on detection of the presence of the insect or mosquito.

Another aspect of the embodiments include a method comprising: providing, in a housing with a narrow path, a directional force through the narrow path to move an insect or mosquito in a predetermined direction, the housing having an isolated basket to trap the insect or mosquito at a location below or at an end of the narrow path; detecting, by one or more detectors, a presence of an insect or mosquito along the narrow path; counting, by a processor, a population in the basket based on detection of the presence of the insect or mosquito; and displaying a representation of an amount of the population in the basket.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which.

DETAILED DESCRIPTION

Embodiments are described herein with reference to the attached figures wherein like reference numerals are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

With traditional traps, the researchers may need to check and manage the traditional traps on a regular basis. The inventors have determined that mosquito district research staff drives a truck regularly to get to the multiple remote places where the mosquito traps are installed. This process of maintenance is costly (such as for gas and vehicle transportation) and requires a large mosquito district staff or workforce to manage the traps.

The inventors have discovered that researchers check the traps manually by hand to count the number of mosquitoes or insects caught in each trap. The effort may turn out in vain if no mosquitoes are in the trap. The inventors have discovered that the researchers are vulnerable to diseases transmitted by mosquitoes being handled while collecting the traps. In fact, one test for the presence of mosquitoes is to expose the arms of technicians in the field and count how many mosquitoes land in a prescribed amount of time. This whole process is not efficient and can be unsafe. Mosquitoes can cause human suffering by carrying critical diseases such as West Nile virus, malaria, Zika and dengue fever.

Figure 1:
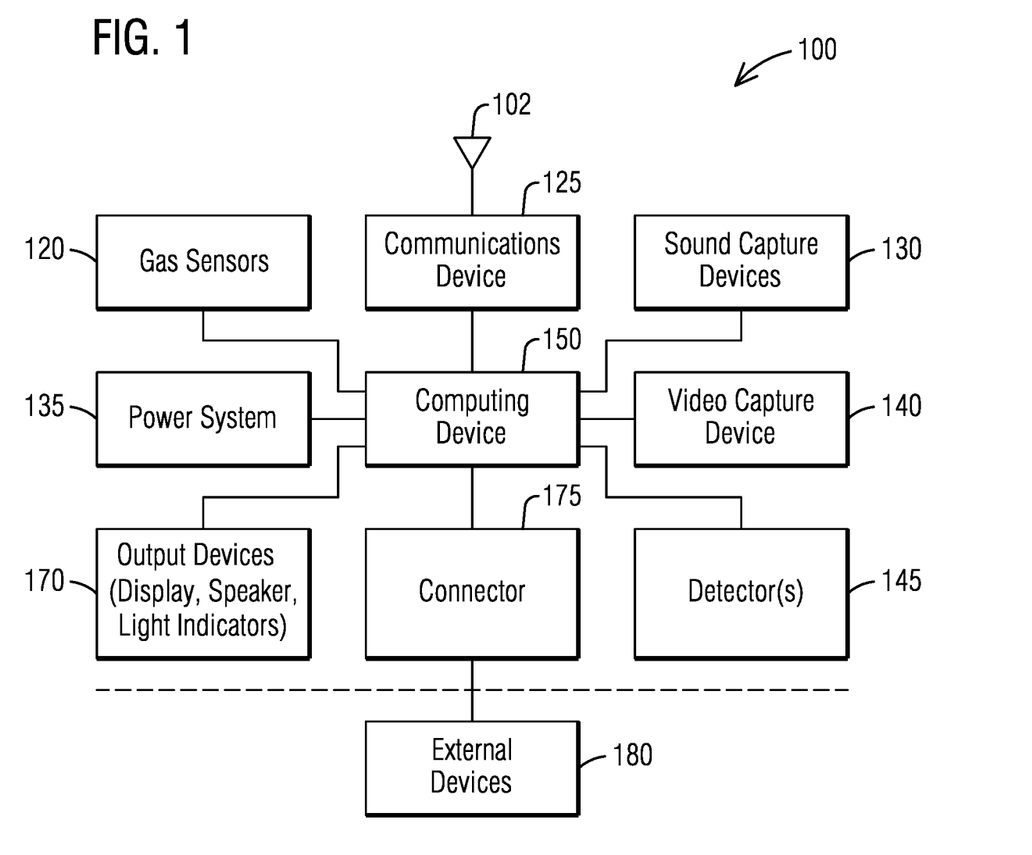
FIG. 1 illustrates a block diagram of the electronic components of the wireless smart mosquito and insect trap (WSMAIT) device.

FIG. 1 illustrates a block diagram of the electronic components of the wireless smart mosquito and insect trap (WSMAIT) device 100. The WSMAIT device 100 may be configured to detect, count, trap, and discard mosquitoes and/or insects. The WSMAIT device 100 may include one or more gas sensor(s) 120, one or more communication device(s) 125, one or more sound capture device(s) 130, one or more power systems 135, a computing device 150, one or more video capture device(s) 140, one or more output device(s) 170, connector(s) 175 and one or more detector(s) 145. The WSMAIT device 100 may include one or more graphical user interfaces 700 (FIG. 7) for an automated reporting, such as, by way of non-limiting example, through remote access. The remote access may include a web-based remote access using wired or wireless communications protocols. Computing device 150 is described in more detail in relation to FIG. 3. The term WSMAIT device 100 is sometimes interchangeably referred to as trap.

The WSMAIT device 100 is configured to communicate using wired and/or wireless communication protocols via the one or more communications devices 125. The communications device 125 may include antenna 102 for wireless communications. The device 100 may communicate using wireless communications using mobile communications protocols or wired communications such as through an Intranet or Internet. The connector(s) 175 may include ports or jacks such as for connecting a USB driver, troubleshooting devices, computing devices or other external peripherals or devices 180 to interface with the computing device 150. The wireless protocols may include one or more of Wi-Fi, ANT, Bluetooth & Bluetooth low energy (BLE), ZigBee, Cellular, near field communications (NFC), and satellite communications.

Figure 3:
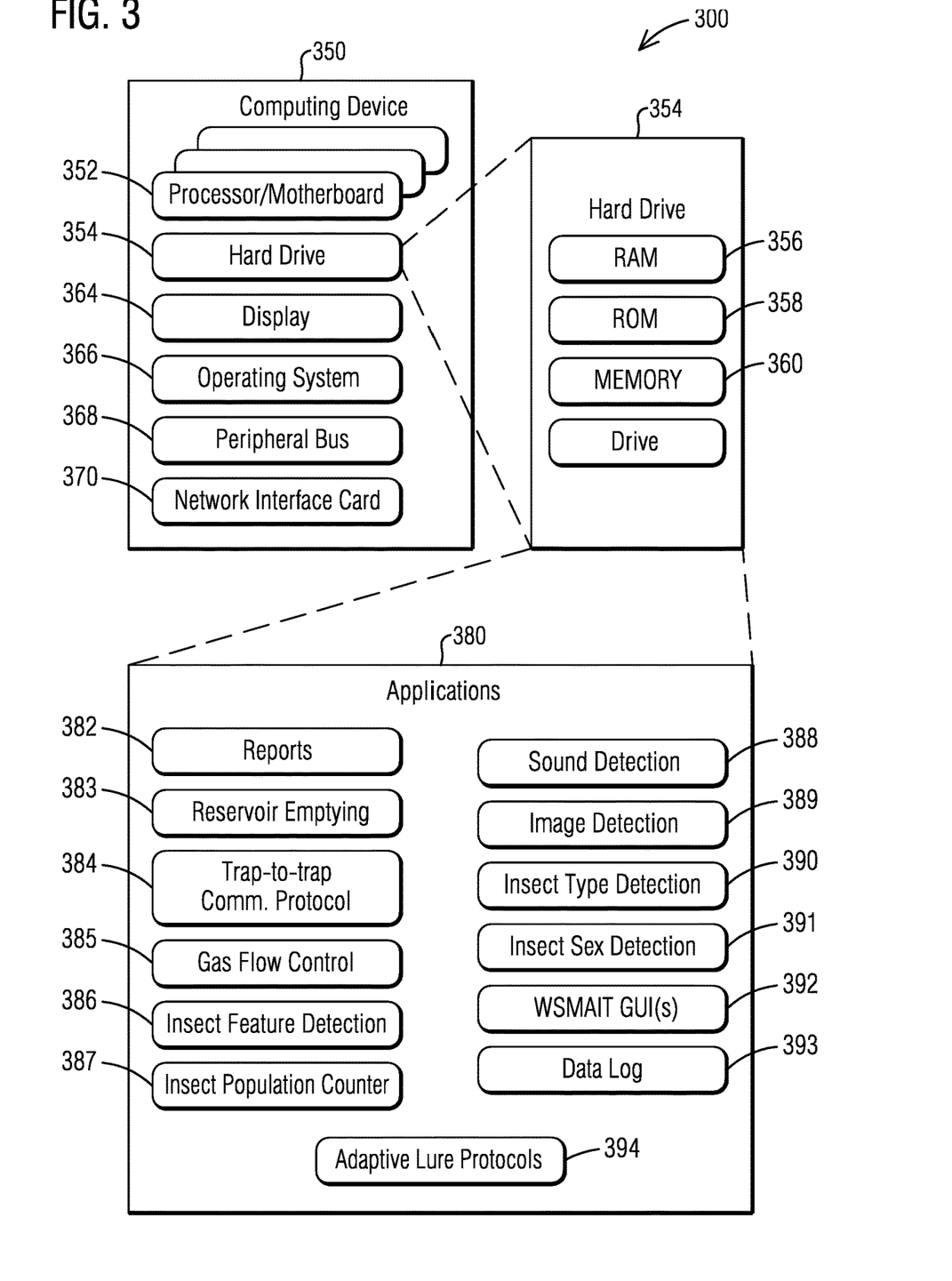
FIG. 3 illustrates a computing device.
Figure 4:
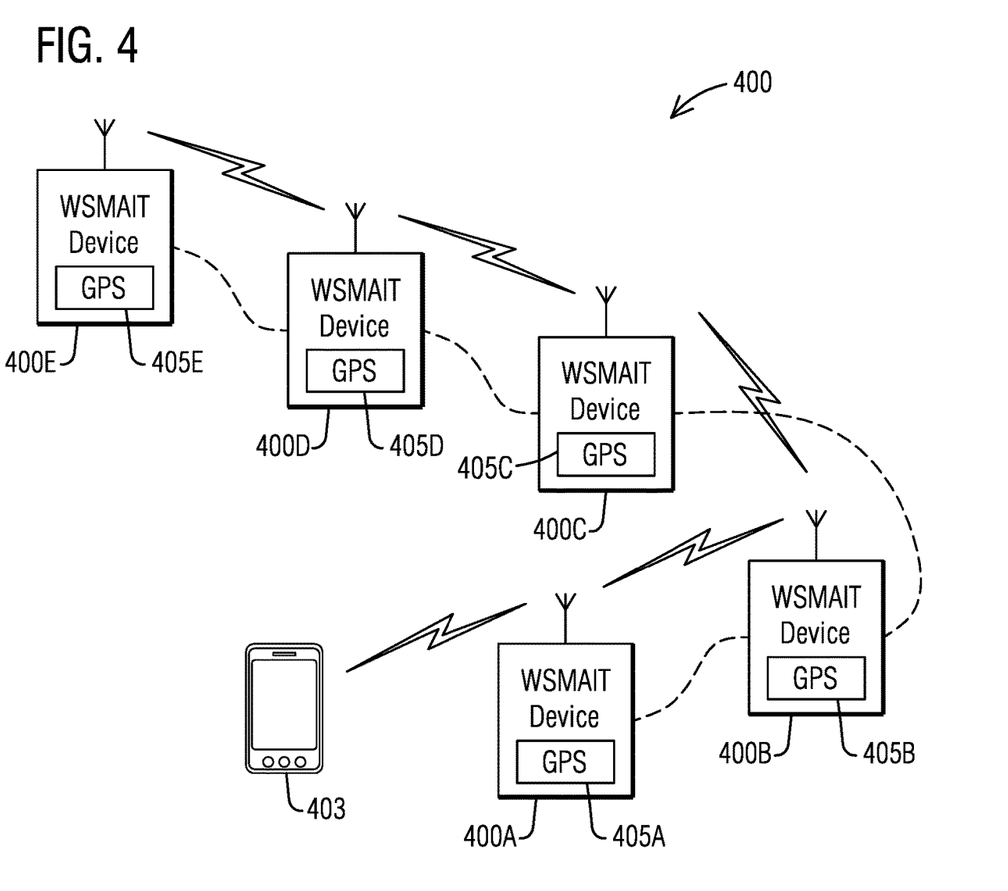
FIG. 4 illustrates a WSMAIT network.

The WSMAIT device 100 may be configured to store the log data 393 (FIG. 3) and report the data though cloud servers (external device), according to the reports application 382 (FIG. 3). The WSMAIT device 100 may be configured to report location data. The WSMAIT device 100 may include a global positioning system (GPS) module (FIG. 4). Alternately, the WSMAIT device 100 may be configured to allow a user to manually enter and store location data of the point of installation. Location data may be used in developing and scheduling mosquito and insect control operations in the vicinity of device 100 using the location information with the environmental information. The location data can also be used to retrieve traps in the field. In an embodiment, the user may be provided directions to the WSMAIT device 100 using a mobile app or GUI. However, the location data may be used to track stolen WSMAIT devices or misplaced WSMAIT devices. The WSMAIT device 100 may be configured to report malfunction or tampering via the reports application 382 (FIG. 3).

The wireless network can be expanded by applying many network topologies. The WSMAIT device 100 can communicate and form a network pattern similar to a sensor network between traps (i.e., device 100). The WSMAIT device 100 can send and receive data between WSMAIT devices, and they can be used as a router and switch devices.

In FIG. 4 a network 400 of WSMAIT devices 400A, 400B, 400C, 400D and 400E is shown. The plurality of WSMAIT devices may communicate with each other using wired or wireless communications via the trap-to-trap communication protocol application 384. In one embodiment, WSMAIT device 400A may be a master device which collects data directly or indirectly from slave WSMAIT devices 400B, 400C, 400D and/or 400E. By way of non-limiting example, a worker may need to only go to a master WSMAIT device 400A to receive all data within a predetermined area, the area corresponding to the service area of the detected population of insects by the slave devices (i.e., devices 400B, 400C, 400D and/or 400E) and the master device (i.e., device 400A). By way of non-limiting example, the slave devices (i.e., devices 400B, 400C, 400D and/or 400E) may send their data logs to the master device (i.e., device 400A) in a predetermined period for communications daily, weekly or some other scheduled time interval via the trap-to-trap communication protocol 384. The slave devices (i.e., devices 400B, 400C, 400D and/or 400E) may only communicate short range or using wired communications to the master device (i.e., device 400A). The master device (i.e., device 400A) may have more memory capacity and communication features in comparison to slave devices (i.e., devices 400B, 400C, 400D and/or 400E). The master device (i.e., device 400A) may communicate with a mobile device 403 or download data to a cloud sever or other central database server.

The network topology of network 400 is not limited to this setting but may use other types of network topologies such as, without limitation, Broadcast, Peer-to-Peer, Star, Scanning mode, Ad hoc, and Mesh network. The trap-to-trap communication protocol 384 may be configured to allow for communications according to a network topology.

The WSMAIT devices 400A, 400B, 400C, 400D and 400E are generally configured to be stationary. The WSMAIT devices 400A, 400B, 400C, 400D and 400E may each includes a global positioning system (GPS) module 405A, 405B, 405C, 405D and 405E, respectively. The GPS location data from each GPS module 405A, 405B, 405C, 405D and 405E may be sent (reported) upon detection of unauthorized movement by the corresponding WSMAIT device 400A, 400B, 400C, 400D and 400E. Movement may also be detected in a variety of ways such as accelerometers and gyroscopes or other inertial navigation systems. Such accelerometers and gyroscopes are found in mobile devices such as cellphones for detecting movement and may be included in each of the WSMAIT devices 400A, 400B, 400C, 400D and 400E.

Referring again to FIG. 1, in operation the WSMAIT device 100 may include one or more sound capture devices 130, video capture device 140 and detectors 145 configured to detect the presence of, features of, sex of, species of and/or type of mosquitoes and insects. The one or more sound capture devices 130 may include audio (audible/inaudible) sound sensors wherein a sound detection application 388 (FIG. 3) determines whether a mosquito or insect. The one or more video capture devices 140 may include video (camera) sensors and image sensors. The one or more detectors 145 may include infrared (IR) sensors, proximity sensors, and ultrasonic sensors.

Placing multiple sensors around the WSMAIT device 100 may make detection more accurate. Instead of using one sound capture device, multiple sounds capture devices around the trap may increase complexity of analysis but it can increase the accuracy of the analysis. Moreover, combinations of the different sensors increase the accuracy of the analysis. Mixed use of sound and video capture devices may provide more accurate detection. Other sensors such as IR sensors, proximity sensors, and ultrasonic sensors can be used to boost the detection accuracy.

The power source 135 of the WSMAIT device 100 may be include a solar (photovoltaic) panels, charging/power conversion unit and battery storage. A rechargeable or one time use battery may be used. The power source 135 may include power from a utility company or a combination of utility electrical energy, solar energy, gas power, or propane gas.

Figure 2A:
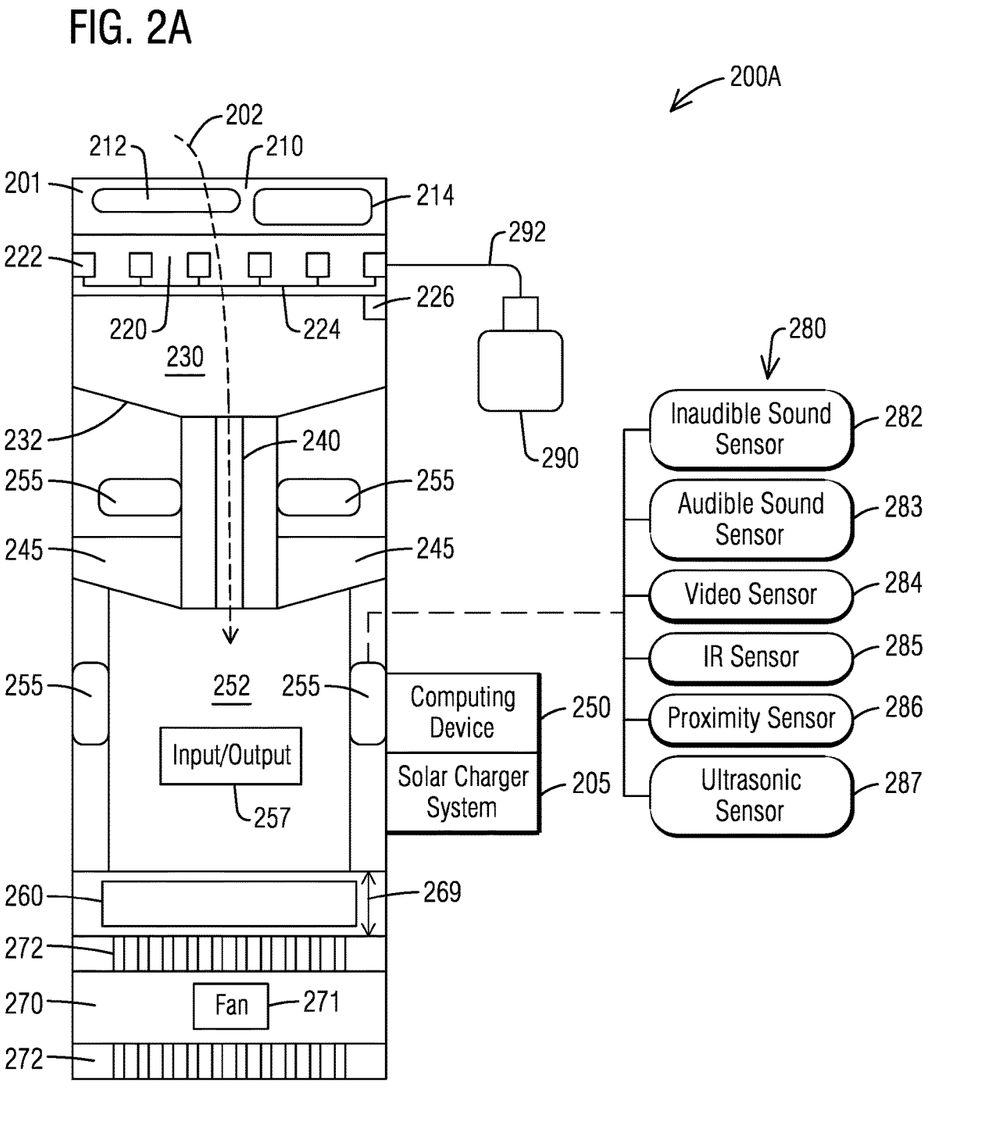
FIG. 2A illustrates a block diagram of the WSMAIT device with a gas supply.

In FIG. 2A a block diagram of the WSMAIT device 200A with a gas supply is shown. The WSMAIT device 200A may include one or more light source(s) 212 to attract one of insects or mosquitoes. The light source(s) 212 may be located at an inlet to the housing 201 of the WSMAIT device 200A. The housing 201 may include an inlet chamber 210 which may include a buzzer, vibrating device and/or speaker, denoted by reference numeral 214. The WSMAIT device 200A may include a plurality of insect attracting devices. If a speaker is used, an audio output file using a predetermined sound or frequency to simulate other insects, frequencies, or sounds which serve to attract insects of like kind or other kinds, may be employed and varied according to the adaptive lure protocols 394 (FIG. 3). Multiple light sources may be distributed in the housing 201, such as at the inlet.

In an embodiment, the housing 201 may include a portion, such as inlet chamber 210, which is transparent to allow light from light source(s) 212 to radiate through the transparent portion. In an embodiment, one or more lights may be installed in a manner so that light is visible by mosquitoes and insects externally. In other words, light may illuminate a portion of the housing 201 to attract the mosquitoes or insects.

The WSMAIT device 200A may include one or more gas sensors 226. The WSMAIT device 200A attracts insects by, such as, light, gas, vibration or sound, depending on the types of insects. If the gas source is used, the gas sensor 226 can be installed and be used to control flow of the gas for efficient use and safety. Therefore, the device 200A may contain a plurality of gas sensors 226. For example, mosquitoes can be attracted by $CO_2$ gas and the device 200A may contain $CO_2$ gas and $CO_2$ sensors (i.e., sensors 226). Alternatively, propane gas or dry ice can be used to obtain $CO_2$ gas. The light, gas, vibration or sound being controlled based on the adaptive lure protocols 394 (FIG. 3).

The one or more gas sensors 226 may be configured to sense a predetermined gas, where the predetermined gas being configured to attract bugs. The WSMAIT device 200A may include a control flow valve to the gas supply (i.e., gas tank 290). The control flow valve may include a release and lock capability being controlled by a gas flow control application 385 (FIG. 3). The gas (i.e., gas tank 290) may include safety features to prevent mishandling of the gas supply. The gas supply may include oxygen ($O_2$), carbon monoxide (CO), carbon dioxide ($CO_2$), etc. based on the applications. However, the preferred gas to attract mosquitoes may be $CO_2$.

The WSMAIT device 200A may be controlled and accessed remotely using wired or wireless communications. The WSMAIT device 200A may store and/or generate a data log 393 (FIG. 3), the data log 393 may include one or more of the measured/detected sound data, videos, images, wingbeat data, analysis data, logs, device status, gas gauge, gas alarm, low-battery alarm, device mal-function alarm, security data, and theft alarms.

The housing 201 of the WSMAIT device 200A may be in communication with the gas tank 290, as seen in FIG. 2A. The tank 290 may receive various control signals, particularly, including gas release and lock control. Other control signals may include a fan (suction) control, detector control, data log control, security control, and all the other resource access control via the computing device 250.

The WSMAIT device 200A is configured to count of the number of mosquitoes or insects using one or more detectors, via an insect population counter application 387 (FIG. 3), as will be described in more detail. The WSMAIT device 200A may be configured to report detection information locally through various feedback or input/output devices 257 such as LED, LCD, buzzer, and speaker on the device 200A.

WSMAIT device 200A is configured to communicate with mobile or portable devices (such as cellphones, smartphones, tablet PC, and mobile computing devices), PC, weather stations, data-servers, web-servers, and so forth using wireless and wired communication protocols, as will be described in more detail in relation to FIG. 3. By way of non-limiting example, the WSMAIT device 200A is configured to provide a notification of when the device's trap reservoir should be emptied. Hence, a sensor may be included in the trap reservoir or basket/trap to indicate when filled to a predetermined limit. Alternately, based on the count reaching a predetermined threshold corresponding to a fill level may cause the device to automatically produce an empty command, according to a reservoir emptying application 383 (FIG. 3).

The WSMAIT device 200A may be configured to empty the trap reservoir automatically or by remote control. For example, the bug researchers manage multiple flying insect traps at remote locations. Some of the traps are installed at the places where they cannot get accessed easily.

The WSMAIT device 200A includes a housing 201 which may be attached to a building, wall, floor, vehicle, airplane, trees, and leaves. The housing 201 may be installed using poles. The gas tank 290 may be external to the housing 201. The gas tank 290 may be internal to the housing 201. The gas supply may be provided via a public utility source.

The WSMAIT device 200A may be configured for under water installation. WSMAIT device 200A may be installed subterranean (buried beneath the ground or earth). Installation settings may include handing the device 200A on a tree; attaching the device 200A to a building; placing the device 200A on the ground; placing the device 200A under the ground; floating the device 200A on water; or placing the device 200A under water. Different installations will be described in more detail in relation to FIGS. 5A-5C.

The housing 201 may include an inlet chamber 210, a gas distribution chamber 220, an intermediate chamber 230, a detection chute 240, a detection chamber 252, a basket or reservoir 260 and a fan chamber 270. The fan chamber 270 may include air holes 272 above and below the chamber 270. The term detection chute will sometimes be interchangeably referred to as a "narrow path."

The mosquitoes or insects are attracted by attraction devices (i.e., lights 212, buzzer, vibrating device and/or speaker 214) in the inlet chamber 210. The attraction devices may include one or more of a light source, buzzer, speaker and/or vibration device to catch the attention of one or more species of mosquitoes and/or one or more species of insects. (Mosquitoes or Insects will hereinafter be referred to as "insects"). As the insects approach or enter the inlet chamber 210, a draft or suction force within the housing 201 will cause the insect to be moved downward into the housing 201 or along a detection path in the housing 201. The insects may be sucked into the housing 201. The sucking may be gentle and at a speed to allow for detection of one or more features of the organism.

Other electronics may include one or more of audio, and/or inaudible sound using buzzer and/or speaker as well as vibration devices. The sound can be many different kinds of frequencies such as audible and/or inaudible frequencies with single tone, multiple tones, tones with harmonics, or generated from a sound file. The sound files may be stored in memory and may be part of the adaptive lure protocols 394.

The trap may be necessary to incorporate with one or more detection methods depending on types of insects. In other words, the device 200A may perform two-way communications between insects and the device to attract the insects, via the adaptive lure protocols 394 (FIG. 3). In that case, the methods of detection may be involved in measuring and analyzing the pattern of the signals or frequencies, such as via the sound detection application 388 (FIG. 3). In some cases, the traps may need to pick up the signals not just though air but some types of liquid and solid medium.

The WSMAIT device 200A may be configured to send signals (audio, light, and so forth) and listen for insects' response via the sound detection application 388. The device 200A may respond adaptably (differently) by sending adaptive (different) signals (audio, light, and so forth) to communicate with the insects and to lure them to the trap. The applications of the device 200A may include one or more adaptive lure protocols 394 (FIG. 3) wherein the lure protocols may vary based on the type of insect. The WSMAIT device 200A may listen first to insects' signals or detect whether the insects' are near using the (audio, video, proximity, and so forth) sensors 282, 283, 284, 285, 286 and 287. Then, the device 200A may send corresponding adaptive (different) signals via the adaptive lure protocols 394 (FIG. 3) to communicate with the insects and to lure them to or in proximity to the inlet chamber 210 using the WSMAIT device 200A.

The housing 201 may be configured with an inlet chamber 210 with a generally open bottom or end, such as without limitation, for ventilation. The open bottom may be closed but with holes to permit air to escape. In proximity to the bottom or end of the housing 201 is a fan chamber 270 having a fan 271 or suction device coupled therein to cause a suction force within the housing 201 in a downward direction or in a direction through the chute toward an outlet of the chute. The suction force is generally placed at a bottom end of the housing 201 to create a force that carries the mosquito or insect through the chambers of the WSMAIT device 200A at a speed that would allow detection sensors 255 to detect the insect parameters. The inlet chamber 210 being at a top end of the housing 201. Below the inlet chamber 210, the housing may include a gas distribution chamber 220 having the plurality of gas distribution holes/outlets 222 formed therein. The gas distribution holes/outlets 222 may be coupled to a gas tube 224. In an embodiment, the outlets 222 vent in a direction toward the outside of the housing 201. The gas tank 290 may communicate a gas on line 292 to the gas distribution system internal to the housing 201. The gas distribution system including a gas tubing 224 coupled to gas distribution holes/outlets 222. The gas distribution holes/outlets 222 may be arranged in and around a perimeter of the housing 201.

A gas attractant may be in close proximity to the inlet. As the insects are sucked into the housing, the insect is directed to a narrowed path in the housing 201. The narrowed path (i.e., detection chute 240) may be in a center of the housing 201. The narrowed path opening may be proceeded by tapered sides 232 of the housing 201 to direct the insect into the narrowed path (i.e., detection chute 240). The entire housing 201 may be placed upside down or inverted so that the insect comes in the bottom and is forced to the top of the trap for counting and identification purposes. Some insect species are attracted to entrances at the bottom of containers as opposed to the top of containers. The dashed line 202 denotes a possible path of an insect.

One or more detection sensors 255 are arranged in proximity to the narrowed path (i.e., detection chute 240). The one or more detection sensors 255 will detect the insects and may determine one or more of the type of insect and the sex of the insect. The narrowed path may be configured with a length that allows analysis of the detected insects for determining one or more of a type of insect and sex of the insect.

The narrowed and long path (i.e., detection chute 240) may limit the number of the captured mosquitoes and insects during at least the counting phase. In order for accurate detection and counting, the narrowed path may allow the device 200A to process one mosquito or insect, or limit the number of mosquitoes or insects at a time. Although multiple mosquitoes or insects may be caught at the same time, the narrowed path limits the number to a certain degree so that the detection and counting can handle the data to be processed and analyzed by using extra information from the detection sensors 255 such as one or more of audio (inaudible or audible) sound sensors 282 and 283, video images sensor 284, proximity sensor 286 and IR sensor 285 and ultrasonic sensor 287. The long path provides the extended process period for detectors for accurate detection. Also, the long path can isolate the interference effects between detectors and inlet or basket.

The detection chute 240 may be configured to allow for detection of one insect or a plurality of insects. Multiple samples may be collected along the length of the chute 240. The WSMAIT device 200A may include an extended path to facilitate accurate detection. The chute may be in a straight line or may have a meandering profile. In an embodiment, the capture basket or reservoir 260 should be separated from the detection chute so that captured insects do not affect the detection and analysis of incoming insects. The dashed line 269 denotes access in housing 201 to the capture basket or reservoir 260 so that the collected insects can be dispensed or removed. The detection chamber 252 after the narrow path 240 may allow for additional inspection and analysis of the insect with additional detection sensors 255. By way of non-limiting example, the narrow path 240 may be used for insect counting while detection chamber 252 may be used to determine one or more features of the insect.

For example, some insects produce a predetermined frequency to be detected by the sound detection application 388. In an embodiment, insects in the capture basket or reservoir have been counted and analyzed. Thus, to prevent or limit duplicate counting and analysis for the same insect, detection needs to be limited to the chute.

WSMAIT device 200A include isolation elements 245 between the end of the chute and the beginning of the basket or reservoir to provide a sound barrier within the housing. The isolation elements 245 may block sound frequencies of interest to reduce the sound effects of the insects in the basket or reservoir 260. Then, the device 200A can determine the types of insects and the number of the trapping insets around the narrowed and long path. The data will be stored and processed by the computing device 250. The housing 201 of the device 200A may include surrounding isolation elements to reduce interference from outside of the device 200A. Additionally, the basket or reservoir 260 may be surrounded with isolation elements to reduce propagation of interference from inside of the basket to the detection sensors 255 within the device 200A.

For instance, for mosquitoes, it is known that 17.4 KHz is the distinct audible frequency for mosquitoes. Thus the WSMAIT device 200A monitors this frequency for detection by the sound detection application 388 (FIG. 3) and increments a population count within the housing by 1 when the frequency is detected. The frequencies and methods can be varied by insects for each different and distinct audible/ inaudible frequency such as wing-beat frequencies.

The detection, decision and analysis may be processed using video or image information using video cameras and IR cameras (i.e., video sensor 284). The other sensor types which can be used include IR sensors 285, proximity sensors 286, and ultrasonic sensors. The detection sensor unit may be any combination of the sensors mentioned to increase the accuracy of the analysis and detection.

Moreover, the WSMAIT device 200A may include additional detection sensors which can be placed intentionally externally or internally to the housing 201 for enhanced analysis. One or more sensors may monitor conditions or insects internal to the housing. The decision by video or image detection application 389 (FIG. 3) will recognize the bugs (i.e., insect or mosquito) that is in the housing 201 of the device 200A. Moreover, WSMAIT device 200A may be configured with a decision mechanism that uses a combination of detectors such as audible and inaudible sound frequencies, videos, or images to increase precision and accuracy of the detection. In addition, importantly, the decision can be provided by the information processed by infrared (IR), proximity, ultrasonic sensors as well.

The accuracy of the detection, analysis, and counting may increase as the number of sensors 255 are used. The use of multiple sound capture sensors around the narrowed and long path and baskets can provide more information to the system for better decisions and analysis for determining the presence and type of insect or other features. Moreover, the mixed use of the different sensors such as a mix of sound, video, and proximity sensors, may increase the accuracy of the decisions.

These sensors 255 can be used to figure out the existence of the captured insects or number of the captured insects. The WSMAIT device 200A may use hybrid sensor information both at around the entrance of the trap, and the inside of the trap basket. The locations of the detectors may vary by the applications. They are not limited to around the entrance of the trap and around the trap basket.

The WSMAIT device 200A may be configured to perform sex and species recognition from audible/inaudible sound frequency information such as wing-beat frequencies. Also, the image detection application 389 (FIG. 3) may use video and image information may interface with the insect type detection application 390 (FIG. 3) and the insect sex detection application 391 (FIG. 3) to determine sex and species recognition, and type of bugs and/or insects.

When the insects are detected, the information can be reported via the reports application 382 (FIG. 3) to the input/output devices 257 such as LEDs, LCDs, buzzers, and/or speakers. Thus, some of the input/output devices 257 serve as a feedback device for indicating one or more parameters of the device for the worker. The WSMAIT device 200A may include solar charger system 205 in some embodiments. When using the solar charger system 205, the solar panels need to be positioned for efficient receipt of solar radiation.

Figure 2B:
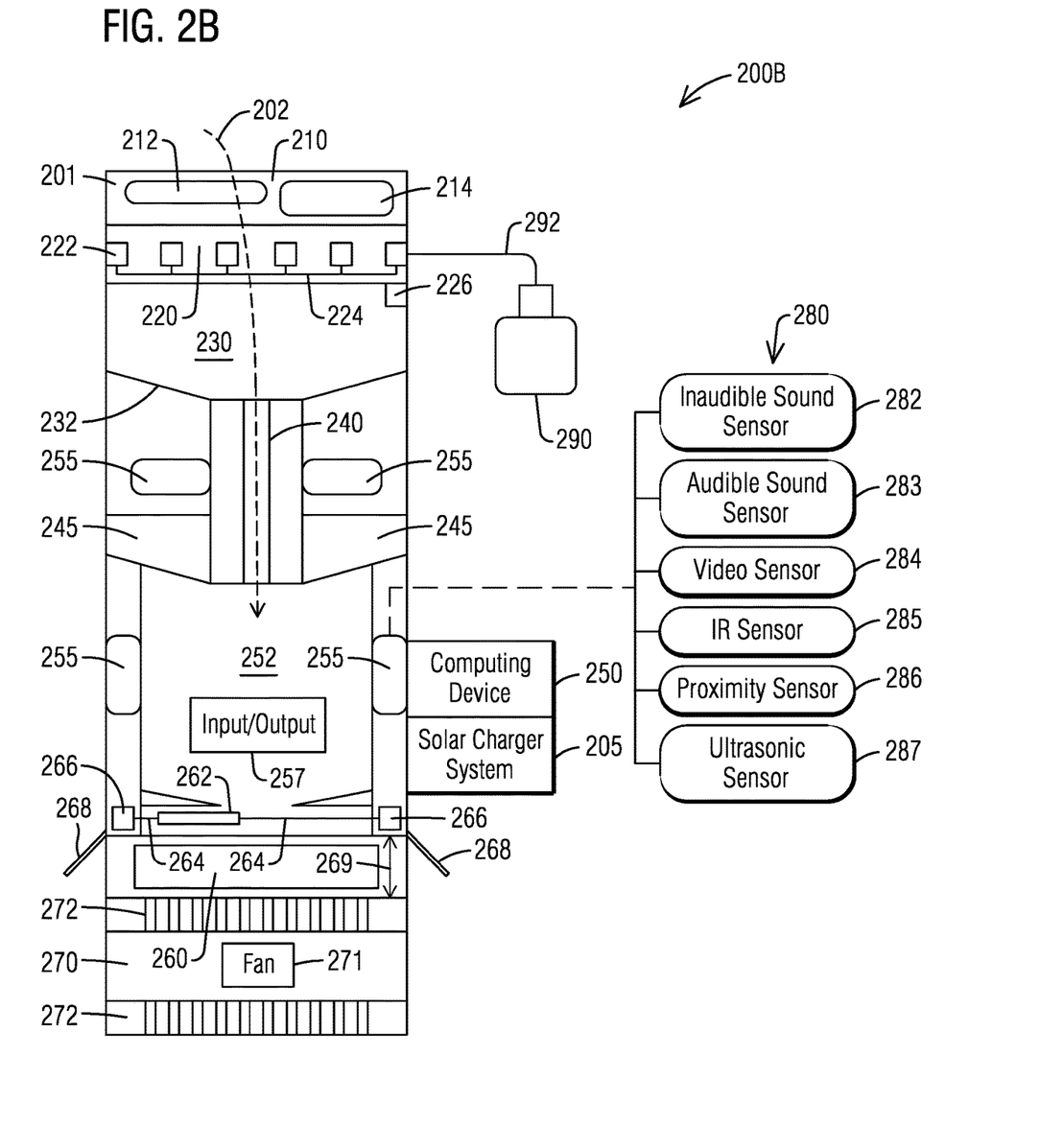
FIG. 2B illustrates a block diagram of the WSMAIT device having an automatic dispensing or emptying basket function and a gas supply.

Referring now to FIG. 2B, the basket or reservoir 260 may be replaced manually and it may be emptied automatically or configured to dispense to a worker the captured/counted insects. Automatic dispensing function may be activated remotely using a mobile device or other computing device. The automatic dispensing may start with closing the top basket cover 262 using motors 266 controlling wires, metal and/or plastic 264 materials. The motor 266 also controls side basket cover 268 to open the air vent. Afterwards, the direction of the fan or suction is controlled to be in an opposite direction. The collected bugs and insects are ejected though opened side basket cover 268. After the emptying procedures is finished, the top basket cover 262 is controlled to be open and side basket covers 268 are controlled to close for normal capture mode. This process can be controlled periodically, remotely and/or automatically. The WSMAIT device 200B of FIG. 2B may include a remotely-controlled basket emptying or dispensing assembly (including at least the motors 266 and cover 262) coupled to the basket or reservoir 260 for emptying the basket or dispensing the captured insects in response to receipt of an empty/dispense control signal. The remotely-controlled emptying/dispensing assembly places the basket back on-line after the emptying/dispensing process is complete via the reservoir emptying application 383 (FIG. 3). The assembly includes an automatic dispensable function (ADF) for remote access and periodic maintenance. The remote access may be carried out by a wireless communication interface, method, and mechanical process.

Referring now to FIG. 3, in a basic configuration, the computing device 350 may include any type of stationary computing device or a mobile computing device. Computing device 350 may include one or more processors 352 and memory and hard drive devices 354. Depending on the exact configuration and type of computing device, memory devices may be volatile (such as RAM 356), non-volatile (such as read only memory (ROM 358), flash memory 360, and the like) or some combination of the two. Memory devices may store operating system 366, one or more applications 380, and may include program data for performing the process described herein. The computing device 350 may carry out one or more processes described herein. Computing device 350 may also have additional features or functionality. For example, computing device 350 may also include additional data storage devices (removable and/or non-removable) such as, for example, magnetic disks, optical disks, or tape. Computer storage media may include volatile and non-volatile, non-transitory, removable and non-removable media implemented in any method or technology for storage of data, such as computer readable instructions, data structures, program modules or other data. System memory, removable storage and non-removable storage are all examples of computer storage media. Computer storage media includes, but is not limited to, RAM, ROM, Electrically Erasable Read-Only Memory (EE- PROM), flash memory or other memory technology, compact-disc-read-only memory (CD-ROM), digital versatile disks (DVD) or other optical storage, magnetic cassettes, magnetic tape, magnetic disk storage or other magnetic storage devices, or any other physical medium which can be used to store the desired data and which can be accessed by computing device. Any such computer storage media may be part of device.

The memory may store applications 380 for carrying out one or more functions described herein. The applications may include one or more of a reports application 382, reservoir emptying application 383, trap-to-trap communications protocol application 384, gas flow control application 385, insect feature detection application 386, insect population counter application 387, sound detection application 388, image detection application 389, insect type detection 390, insect sex detection application 391, and WSMAIT GUI(s) 392.

The computing device 350 and applications 380 may be configured to determine features of the mosquito or insect. The features may include a sex, as detected by the insect sex detection application 391 and a type or species, as detected by the insect type detection application 390. Other features may include mating status and age of the insect, as determined by insect feature detection application 386. The features as determined by insect feature detection application 386 may include various anatomical or characteristic properties of the organism (mosquito or insect) using one or more of audible/inaudible frequency, harmonic amplitude, body-shape and body-size. Other characteristics may include flight speed. The insect type detection application 390 may include location specific data. For example certain species may only be located in certain regions in various countries, states, cities, etc. Thus, the profiles for comparison may be compared to regional profiles for identification purposes.

Computing device 350 may also include or have interfaces for input device(s) (not shown) such as a keyboard, mouse, pen, voice input device, touch input device, etc. The computing device 350 may include or have interfaces for connection to output device(s) such as a display 364, speakers, etc. The computing device 350 may include a peripheral bus 368 for connecting to peripherals. Computing device 350 may contains communication connection(s) that allow the device to communicate with other computing devices, such as over a network or a wireless network. By way of example, and not limitation, communication connection(s) may include wired media such as a wired network or direct-wired connection, and wireless media such as acoustic, radio frequency (RF), infrared and other wireless media. The computing device 350 may include a network interface card 370 to connect (wired or wireless) to a network.

Computer program code for carrying out operations described above may be written in a variety of programming languages, including but not limited to a high-level programming language, such as C, C++, C#, or Objective-C, for development convenience. In addition, computer program code for carrying out operations of embodiments described herein may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits, Application-Specific Integrated Circuits (ASICs), or a programmed Digital Signal Processor (DSP) or microcontroller. A code in which a program of the embodiments is described can be included as a firmware in a RAM, a ROM and a flash memory. Otherwise, the code (computer program instructions) can be stored in a tangible, non-transitory computer-readable storage medium such as a magnetic tape, a flexible disc, a hard disc, a compact disc, a photo-magnetic disc, a digital versatile disc (DVD).

The embodiments may be configured for use in a computer or a data processing apparatus which includes a memory, such as a central processing unit (CPU), a RAM and a ROM as well as a storage medium such as a hard disc.

Figure 5A:
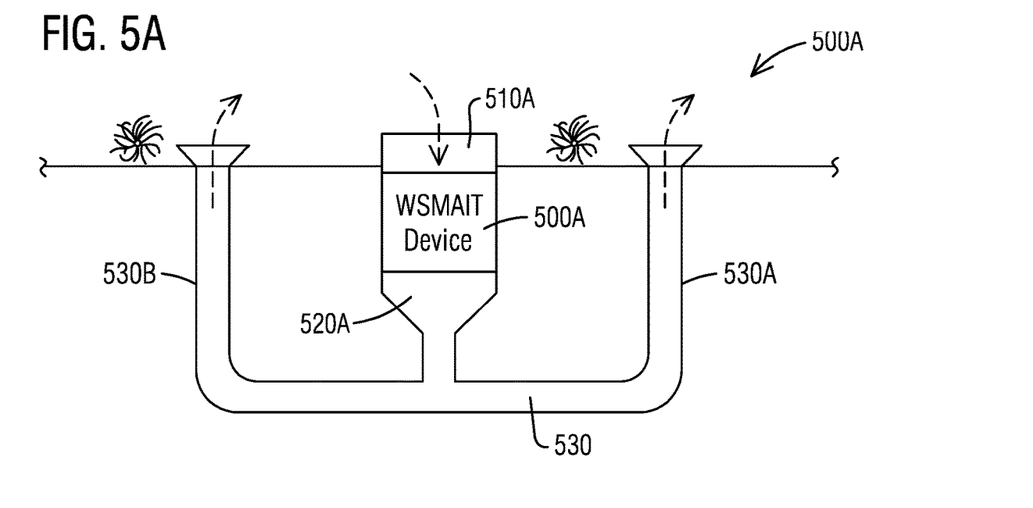
FIG. 5A illustrates a WSMAIT device installed subterranean.

FIG. 5A illustrates a WSMAIT device 500A installed subterranean. The WSMAIT device 500A is shown below ground. The inlet chamber 510A may be flush with the ground or above or below the ground. In one or more embodiments, the gas chamber may be located above ground or underground. Chamber 520A takes the air from the WSMAIT device 500A and conducts it to flow out of the ground. In some embodiment, gas may not be used. In other example, there may be a clearance between the device 500A and ground, earth, pavement, concrete, or other underground structures so that gas can permeate in the area immediately (or perimeter) around the housing of device 500A. In FIG. 5A, conduits (pipes, hoses or tubes) 530, 530A and 530B may be coupled to and underneath the housing of device 500A. Conduit 530 may be arranged to curve up denoted by tubes 530A and 530B toward the ground and extend above the ground to provide a source of air venting. The inlet chamber 510A may be flush with the air vents.

Figure 5B:
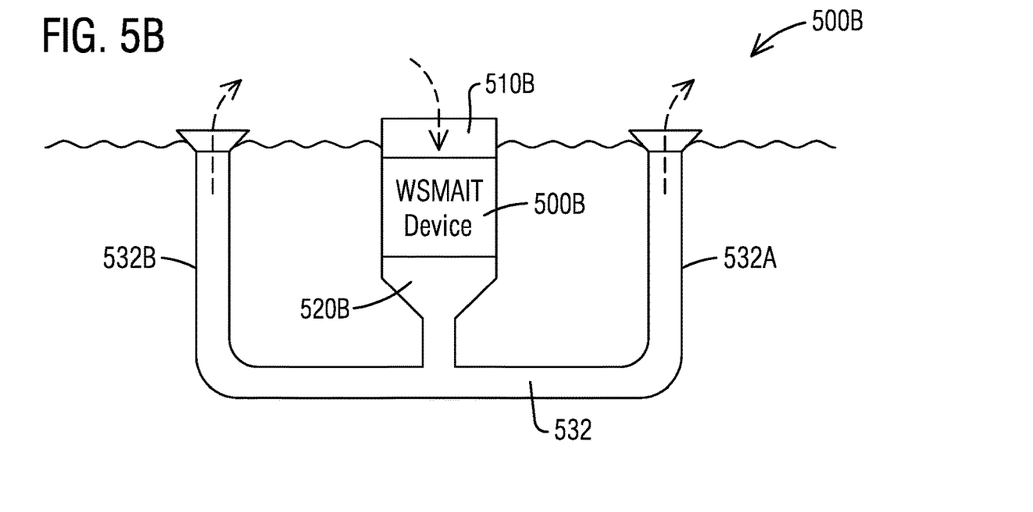
FIG. 5B illustrates a WSMAIT device installed under water.

FIG. 5B illustrates a WSMAIT device 500B installed under water. Device 500B has an insect trap inlet and air flow port chamber 510B and the air is conducted to chamber 520B and out through air flow outlets 532, 532A and 532B above the water line. In FIG. 5B, conduits (pipes, hoses or tubes) 532, 532A and 532B coupled to and underneath the housing of device 500B. Conduit 532 may be arranged to curve up denoted by tubes 532A and 532B toward the top of the water surface to provide a source of air venting.

Figure 5C:
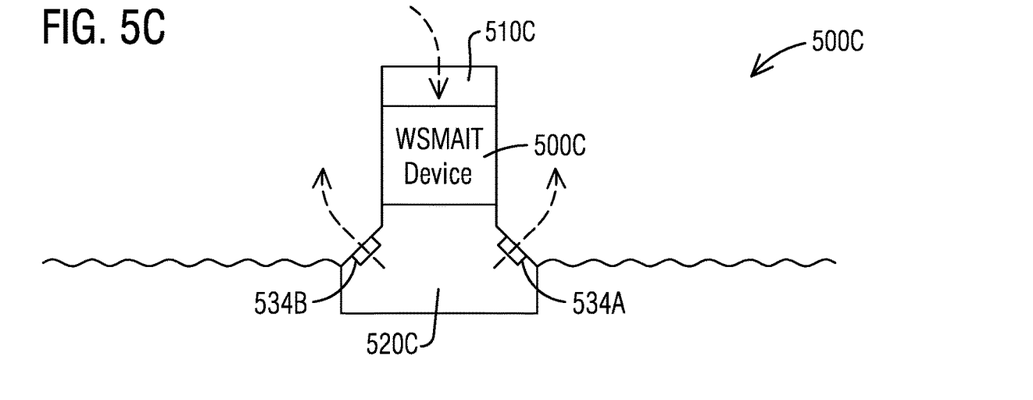
FIG. 5C illustrates a WSMAIT device floating on water.

FIG. 5C illustrates a WSMAIT device 500C floating on water. Device 500C has an insect trap inlet and air flow port chamber 510C and air flows through the WSMAIT device 500C into chamber 520C. The housing of device 500C is configured to float. The base of the housing is wider and includes air outlets 534A and 534B to flow air out the device 500C. The wider base of the WSMAIT device 500C may provide more stability and maintain the device upright so that the inlet 510C remains above water.

In one or more embodiments, the WSMAIT device 100. 200A, and 200B is water-proof.

Figure 6:
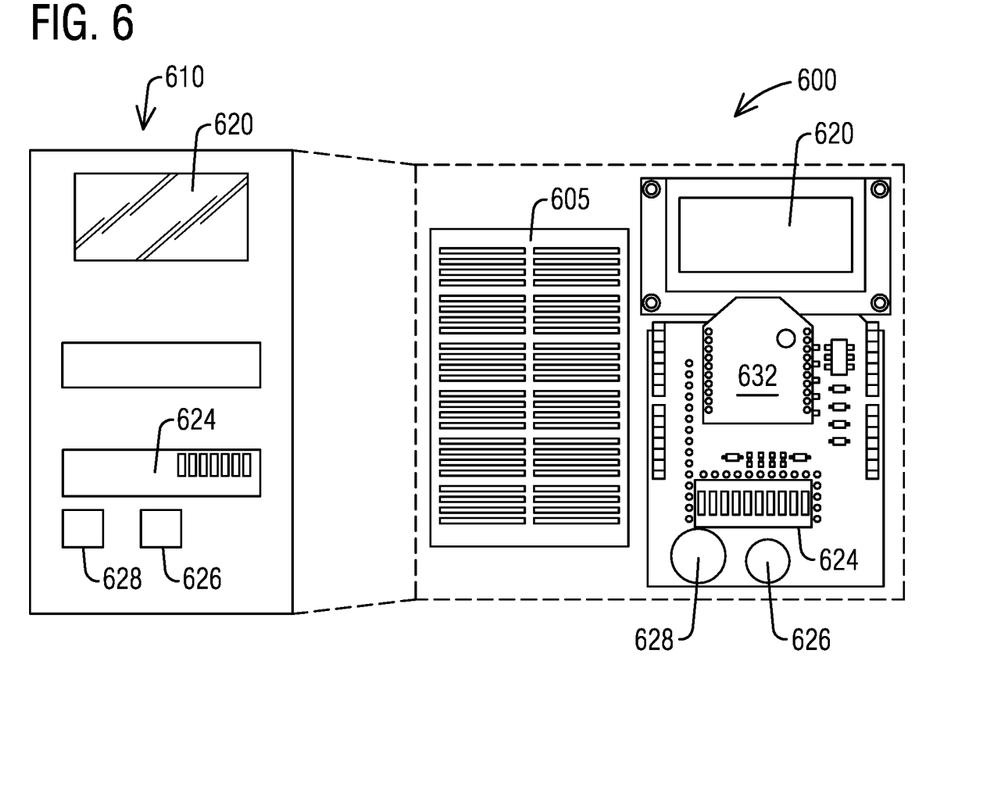
FIG. 6 illustrates an WSMAIT device prototype.

FIG. 6 illustrates the electronics of a WSMAIT device prototype. The electronics housing 600 includes an external display (liquid crystal display) 620 viewable externally. The solar panels 605 are installed on external surfaces of the housing. A computer board is shown with a wireless module 632, and audio devices (i.e., microphone 626 and buzzer/speaker 628). The external side of housing 600 also includes a light emitting diode (LED) display 624 to provide indication of the level of counted population within the WSMAIT device 600. By way of non-limiting example, bars as shown to denote an amount of fill in the basket or reservoir 260.

Figure 7:
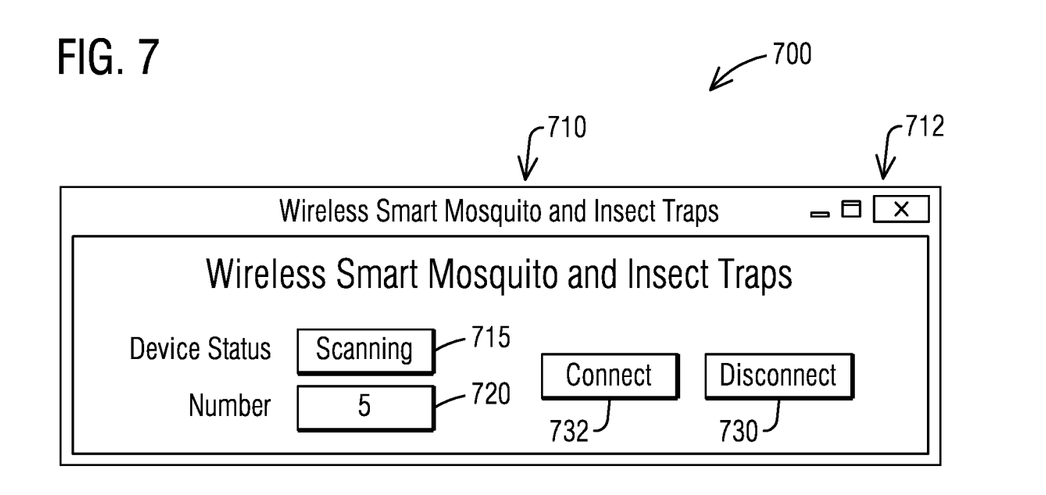
FIG. 7 illustrates a graphical user interface (GUI) for monitoring the WSMAIT device.

FIG. 7 illustrates a graphical user interface (GUI) 700 for monitoring the WSMAIT device. The GUI 700 may be configured to report a population count in data field 720, a current operational status in data field 715 of the device and provide control buttons to connect 732 to or disconnect 730 from a particular device. The GUI is exemplary and other GUIs may be used to control the operation of the device in accordance the features described herein.

Figure 8:
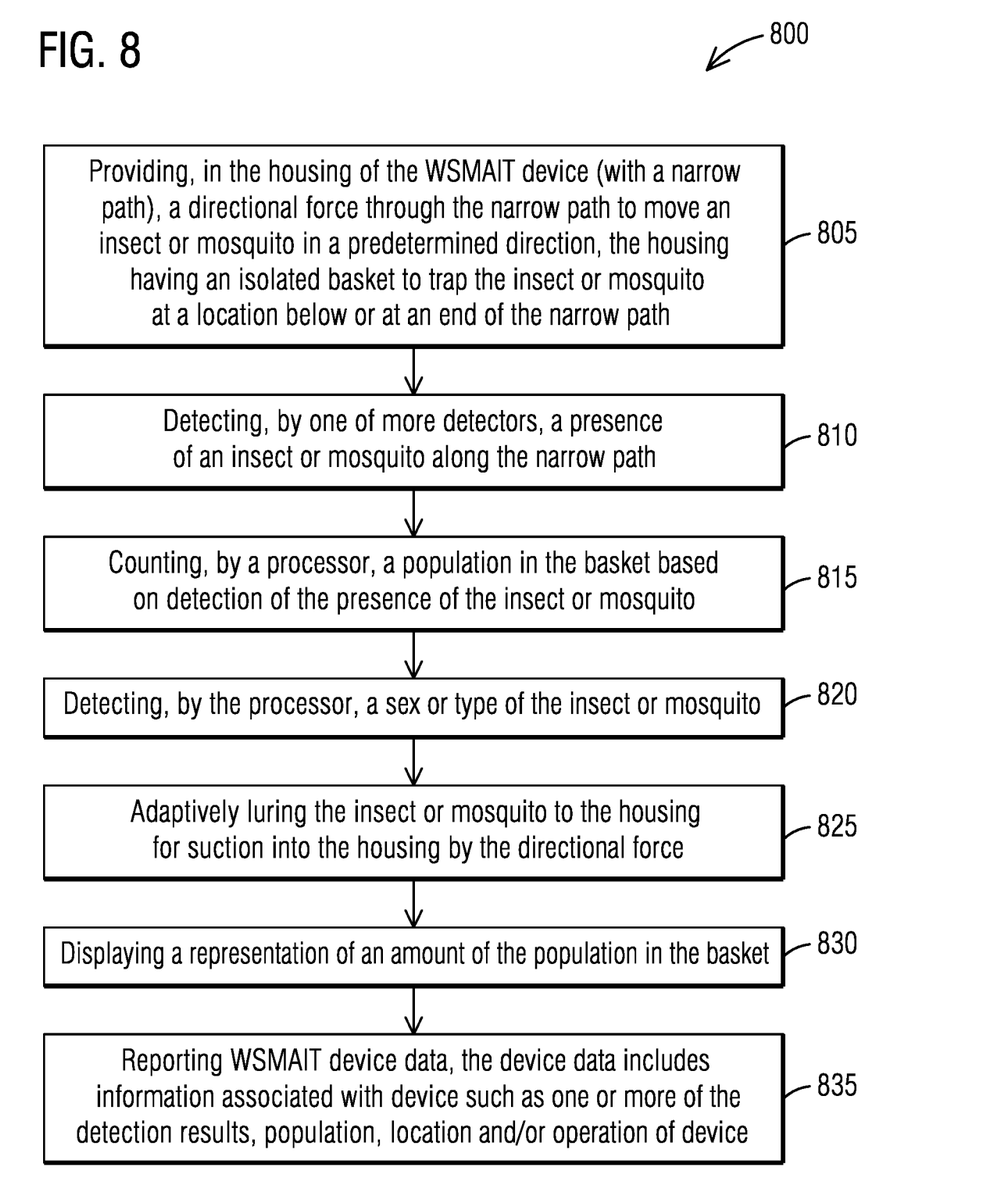
FIG. 8 illustrates a flowchart of a method for the monitoring and operation of the WSMAIT device.

The embodiments herein may be configured to report near real-time population data. Certain embodiments may be configured to report population counts via the reports application 382 (FIG. 3) over a certain predetermine threshold immediately so that spraying or treatment of over populated areas (i.e., over populated by insects or mosquitoes) can be scheduled. Feedback of new population counts may be configured to be in real time or scheduled, such as, after an over populated area is treated. FIG. 8 illustrates a flowchart of a method 800 for the monitoring and operation of the WSMAIT device. The blocks in the flowchart may be performed in the order shown or in a different order. One or more of the blocks may be performed contemporaneously with other blocks. Blocks may be added or omitted.

The method will be described in relation to FIGS. 2A, 2B and FIG. 3. The method 800 includes providing, in the housing 201 of the WSMAIT device (with a narrow path), a directional force through the narrow path 240 to move an insect or mosquito in a predetermined direction, at block 805. The housing 201 has an isolated basket 260 to trap the insect or mosquito at a location below or at an end of the narrow path 240. At block 810, the method 800 may include detecting, by one or more detectors 255, a presence of an insect or mosquito along the narrow path. At block 815, the method may include counting, by a processor 352, a population in the basket based on detection of the presence of the insect or mosquito. At block 820, the method may include detecting, by the processor 352, a sex or type of the insect or mosquito. At block 825, the method may include adaptively luring the insect or mosquito to the housing for suction into the housing by the directional force. The block 825 can be performed at the beginning of the method 800 such as before and/or during block 805 wherein the luring may be adapted and changed throughout any blocks of the method.

At block 830, the method may include displaying a representation of an amount of the population in the basket. At block 835, the method may include reporting, the WSMAIT device data, the device data includes information associated with the device such as one or more of the detection results, population, location and/or operation of device. The WSMAIT device data may include information in the data log 393.

The "step-by-step process" for performing the claimed functions herein is a specific algorithm, and may be shown as a mathematical formula, in the text of the specification as prose, and/or in a flow chart. The instructions of the software program create a special purpose machine for carrying out the particular algorithm. Thus, in any means-plus-function claim herein in which the disclosed structure is a computer, or microprocessor, programmed to carry out an algorithm, the disclosed structure is not the general purpose computer, but rather the special purpose computer programmed to perform the disclosed algorithm.

A general purpose computer, or microprocessor, may be programmed to carry out the algorithm/steps for creating a new machine. The general purpose computer becomes a special purpose computer once it is programmed to perform particular functions pursuant to instructions from program software of the embodiments described herein. The instructions of the software program that carry out the algorithm/steps electrically change the general purpose computer by creating electrical paths within the device. These electrical paths create a special purpose machine for carrying out the particular algorithm/steps.

Unless otherwise defined, all terms (including technical and scientific terms) used herein have the same meaning as commonly understood by one of ordinary skill in the art to which embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In particular, unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such data storage, transmission or display devices.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another.

While various disclosed embodiments have been described above, it should be understood that they have been presented by way of example only, and not limitation. Numerous changes, omissions and/or additions to the subject matter disclosed herein can be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof.

Therefore, the breadth and scope of the subject matter provided herein should not be limited by any of the above explicitly described embodiments. Rather, the scope of the embodiments should be defined in accordance with the following claims and their equivalents.

We claim:

1. A device comprising:
   a housing having a directional force through a narrow path to move an insect or mosquito in a predetermined direction;
   one or more detectors to detect a presence of an insect or mosquito along the narrow path;
   an isolated basket to trap the insect or mosquito at a location below or at an end of the narrow path;

a processor to track a count of a population in the basket based on detection of the presence of the insect or mosquito; and a remotely-controlled basket emptying assembly coupled to the basket for emptying the basket in response to receipt of a control signal and placing the basket back on-line after the emptying is complete.

2. The device of claim 1, further comprising a suction device at a bottom of the housing, the suction device causing the directional force through the narrow path.

3. The device of claim 1, further comprising isolation elements to isolate the basket (260) from at least a portion of the narrow path.

4. The device of claim 1, wherein the suction device is a fan.

5. The device of claim 1, wherein the processor is configured to detect one of a sex or type of the insect or mosquito; and to adaptively lure the insect or mosquito to the housing for suction into the housing by the directional force.

6. The device of claim 1, further comprising a global position system for identifying a location of the device; wherein the processor is configured to report a location of the device.

7. The device of claim 1, further comprising a solar power system for powering the device.

8. The device of claim 1, further comprising a communication device (175) configured to communicate with a mobile device.

9. A network comprising:
a plurality of insect or mosquito trapping devices in communication with each other, each device comprising:
a housing having a directional force through a narrow path to move an insect or mosquito in a predetermined direction;
one or more detectors to detect a presence of an insect or mosquito along the narrow path;
an isolated basket to trap the insect or mosquito at a location below or at an end of the narrow path;
a processor to track a count of a population in the basket based on detection of the presence of the insect or mosquito; and
a remotely-controlled basket emptying assembly coupled to the basket for emptying the basket in response to receipt of a control signal and placing the basket back on-line after the emptying is complete.

10. The network of claim 9, each device further comprising a suction device at a bottom of the housing, the suction device causing the directional force through the narrow path.

11. The network of claim 9, each device further comprising isolation elements to isolate the basket from at least a portion of the narrow path (240).

12. The network of claim 9, wherein the suction device is a fan.

13. The network of claim 9, wherein the processor is configured to adaptively lure the insect or mosquito to the housing for suction into the housing by the directional force; and to detect one of a sex or type of the insect or mosquito.

14. The network of claim 9, further comprising a global position system for identifying a location of the device; wherein the processor is configured to report a location of the device.

15. The network of claim 9, wherein one of the plurality of trapping devices is a master device and the other of the plurality of trapping devices are slave devices to the master device.

16. A method comprising:
providing, in a housing with a narrow path, a directional force through the narrow path to move an insect or mosquito in a predetermined direction, the housing having an isolated basket to trap the insect or mosquito at a location below or at an end of the narrow path;
detecting, by one or more detectors, a presence of an insect or mosquito along the narrow path;
counting, by a processor, a population in the basket based on detection of the presence of the insect or mosquito;
displaying a representation of an amount of the population in the basket;
determining when the basket needs emptying; and
emptying, by a remotely-controlled basket emptying assembly, the basket in response to determining that the basket needs emptying.

17. The method of claim 16, further comprising:
adaptively luring the insect or mosquito to the housing for suction into the housing by the directional force; and
detecting, by the processor, a sex or type of the insect or mosquito.

18. The method of claim 16, further comprising:
detecting a location of the device; and
reporting the location of the device.

* * * * *